United States Patent
Ng-Thow-Hing et al.

(10) Patent No.: US 9,514,650 B2
(45) Date of Patent: Dec. 6, 2016

(54) SYSTEM AND METHOD FOR WARNING A DRIVER OF PEDESTRIANS AND OTHER OBSTACLES WHEN TURNING

(71) Applicant: HONDA MOTOR CO., LTD.

(72) Inventors: Victor Ng-Thow-Hing, Sunnyvale, CA (US); Cuong Tran, Hanoi (VN)

(73) Assignee: HONDA MOTOR CO., LTD., Tokyo (JP)

( * ) Notice: Subject to any disclaimer, the term of this patent is extended or adjusted under 35 U.S.C. 154(b) by 38 days.

(21) Appl. No.: 14/173,506

(22) Filed: Feb. 5, 2014

(65) Prior Publication Data
US 2014/0266656 A1     Sep. 18, 2014

Related U.S. Application Data

(63) Continuation-in-part of application No. 13/800,822, filed on Mar. 13, 2013, now Pat. No. 9,047,703.

(51) Int. Cl.
| | | |
|---|---|---|
| *G06T 19/00* | (2011.01) | |
| *G08G 1/16* | (2006.01) | |
| *B60W 50/14* | (2012.01) | |
| *B62D 15/02* | (2006.01) | |

(52) U.S. Cl.
CPC .............. *G08G 1/166* (2013.01); *B60W 50/14* (2013.01); *B62D 15/0295* (2013.01); *G08G 1/167* (2013.01); *B60W 2050/146* (2013.01); *B60W 2550/10* (2013.01); *B60W 2550/402* (2013.01)

(58) Field of Classification Search
CPC . G06T 19/006; G06T 11/60; G02B 27/0101; B60Q 1/54; B60Q 1/525; B60K 35/00; G08G 1/16; G08G 1/166; B60W 30/08; B60W 30/095; B60W 50/14; B60W 2050/143; B60W 2050/0146; B60W 2550/10
USPC ............. 345/7, 633; 382/104, 107; 340/435, 340/436, 441, 461, 425.5; 715/708
See application file for complete search history.

(56) References Cited

U.S. PATENT DOCUMENTS

| | | | |
|---|---|---|---|
| 5,519,536 | A  | 5/1996  | Hoehn |
| 6,727,807 | B2 | 4/2004  | Trajkovic et al. |
| 6,919,866 | B2 | 7/2005  | Kanevsky et al. |
| 7,561,966 | B2 | 7/2009  | Nakamura et al. |
| 7,605,773 | B2 | 10/2009 | Janssen |
| 7,680,592 | B2 | 3/2010  | Ikeda |

(Continued)

FOREIGN PATENT DOCUMENTS

EP     2639771     9/2013

OTHER PUBLICATIONS

In-Vehicle AR-HUD System to Provide Driving-Safety Information: Park, Hye Sun, Min Woo Park, Kwang Hee Won, Kyong-Ho Kim, and Soon Ki Jung ETRI Journal 35, No. 6 (2013)

(Continued)

*Primary Examiner* — Chante Harrison
(74) *Attorney, Agent, or Firm* — Arent Fox LLP

(57) ABSTRACT

A system for warning of potential hazards when a vehicle is turning has a sensor coupled to the vehicle and configured to capture data of objects located around the vehicle. A control unit is coupled to the sensor for processing the data captured by the sensor to generate graphical representations of objects captured by the sensor, graphical representations of projected paths of moving objects captured; and a graphical representation of a projected turning path of the vehicle.

18 Claims, 4 Drawing Sheets

(56) References Cited

U.S. PATENT DOCUMENTS

| | | | |
|---|---|---|---|
| 7,815,313 B2 | 10/2010 | Ito et al. | |
| 7,847,678 B2 | 12/2010 | Kawamata et al. | |
| 8,009,024 B2 | 8/2011 | Enya et al. | |
| 8,035,493 B2 | 10/2011 | Hioki | |
| 8,049,609 B2 | 11/2011 | Takahashi et al. | |
| 8,138,990 B2 | 3/2012 | Kakizaki | |
| 8,144,076 B2 | 3/2012 | Kakizaki | |
| 9,043,083 B2* | 5/2015 | Kadowaki | B62D 15/027 701/36 |
| 9,073,484 B2* | 7/2015 | Aimura | B60R 1/00 |
| 9,142,132 B2* | 9/2015 | Yao | B60T 7/22 |
| 9,294,733 B2* | 3/2016 | Watanabe | H04N 7/18 |
| 2005/0134479 A1 | 6/2005 | Isaji et al. | |
| 2005/0149251 A1 | 7/2005 | Donath et al. | |
| 2006/0055525 A1* | 3/2006 | Kubota et al. | 340/461 |
| 2006/0103590 A1 | 5/2006 | Divon | |
| 2006/0151223 A1 | 7/2006 | Knoll | |
| 2007/0182527 A1* | 8/2007 | Traylor | B60Q 9/008 340/435 |
| 2008/0015772 A1 | 1/2008 | Sanma et al. | |
| 2008/0133136 A1 | 6/2008 | Breed et al. | |
| 2009/0058761 A1 | 3/2009 | Chen et al. | |
| 2009/0083627 A1* | 3/2009 | Onda et al. | 715/708 |
| 2010/0098297 A1* | 4/2010 | Zhang | 382/104 |
| 2010/0157430 A1 | 6/2010 | Hotta et al. | |
| 2010/0253489 A1 | 10/2010 | Cui et al. | |
| 2010/0253494 A1* | 10/2010 | Inoue | 340/436 |
| 2010/0253540 A1* | 10/2010 | Seder et al. | 345/7 |
| 2010/0274478 A1* | 10/2010 | Takahashi | 345/633 |
| 2011/0087433 A1* | 4/2011 | Yester | 701/213 |
| 2011/0128139 A1 | 6/2011 | Tauchi et al. | |
| 2011/0153198 A1 | 6/2011 | Kokkas et al. | |
| 2011/0181728 A1 | 7/2011 | Tieman et al. | |
| 2011/0199199 A1* | 8/2011 | Perkins | B60Q 1/506 340/435 |
| 2011/0288766 A1* | 11/2011 | Nagasawa et al. | 701/201 |
| 2011/0313653 A1 | 12/2011 | Lindner | |
| 2012/0154441 A1 | 6/2012 | Kim | |
| 2012/0200476 A1 | 8/2012 | Kanamori et al. | |
| 2012/0206483 A1 | 8/2012 | Funabashi | |
| 2012/0218093 A1* | 8/2012 | Yoshizawa et al. | 340/435 |
| 2012/0224060 A1 | 9/2012 | Gurevich et al. | |
| 2012/0224062 A1 | 9/2012 | Lacoste et al. | |
| 2012/0235805 A1* | 9/2012 | Nogami et al. | 340/441 |
| 2012/0249589 A1 | 10/2012 | Gassner et al. | |
| 2012/0314071 A1* | 12/2012 | Rosenbaum et al. | 348/148 |
| 2013/0120850 A1 | 5/2013 | Lambert et al. | |
| 2013/0293582 A1 | 11/2013 | Ng-Thow-Hing | |
| 2013/0317735 A1 | 11/2013 | Mann | |
| 2014/0063064 A1 | 3/2014 | Seo et al. | |
| 2014/0203925 A1* | 7/2014 | Augst | B60Q 9/007 340/435 |
| 2014/0204267 A1* | 7/2014 | Akiba | 348/362 |
| 2014/0267398 A1* | 9/2014 | Beckwith | G08G 1/166 345/633 |
| 2014/0268353 A1 | 9/2014 | Fujimura et al. | |
| 2014/0362195 A1* | 12/2014 | Ng-Thow-Hing et al. | 348/51 |
| 2015/0035685 A1* | 2/2015 | Strickland | B60Q 9/008 340/901 |
| 2015/0298547 A1* | 10/2015 | Inoue | B60W 30/09 701/70 |
| 2015/0329043 A1* | 11/2015 | Skvarce | B60Q 9/008 340/435 |
| 2015/0375680 A1* | 12/2015 | Watanabe | B60R 1/00 701/36 |

OTHER PUBLICATIONS

Bergmeier, et al., "Augmented Reality in Vehicle—Technical Realisation of a Contact Analogue Head-up Display Under Automotive Capable Aspects: Usefulness Exemplified Through Night Vision Systems", AZT online, Edition Sep. 2008.

Howard, B., "See the Future: Augmented Reality Head-up Displays Beckon", Extreme Tech, Web, <http://www.extremetech.com/extreme/114635-augmented-reality-head-up-displays-beckon/2>, Jan. 20, 2012.

Tonnis, et al., "Experimental Evaluation of an Augmented Reality Visualization for Directing a Car Driver's Attention", Fourth IEEE and ACM International Symposium on Mixed and Augmented Reality (ISMAR'05), pp. 56-59, 2005.

Tran, C. et al., "A Left-Turn Driving Aid Using Projected Oncoming Vehicle Paths with Augmented Reality", Proceedings of the 5th International Conference on Automotive USer Interfaces and Interactive Vehicular Applications, p. 300-307, Oct. 28-30, 2013.

* cited by examiner

SYSTEM AND METHOD FOR WARNING A DRIVER OF PEDESTRIANS AND OTHER OBSTACLES WHEN TURNING

RELATED APPLICATIONS

The present application is a Continuation-In-Part of U.S. Patent Application entitle "AUGMENTED REALITY HEADS UP DISPLAY (HUD) FOR LEFT TURN SAFETY CUES," having Ser. No. 13/800,822, filed Mar. 13, 2013, in the name of Lee Beckwith and Victor Ng-Thow-Hing.

TECHNICAL FIELD

The present application generally relates to a vehicle warning system, and, more particularly, to a system and method for enhancing a driver's awareness of pedestrians and other objects by showing projected travel paths of the vehicle and pedestrian and/or moving object when the vehicle is making a turn.

BACKGROUND

Motorized vehicles may be equipped with various kinds of warning systems. These warning systems may be general warning systems that inform the driver of different operating conditions of the vehicle. For example, vehicles may be equipped with warning systems which may be used to warn the driver of low fuel amounts, high and or low engine temperature, a drop in oil pressure, problems in charging the vehicle battery, doors and or trunks that are open and the like.

Motorized vehicles may further be equipped with more advanced warning systems which may be used to warn the driver of the vehicle about potentially dangerous situations involving other traffic participants. For example, warning systems have been designed for vehicles that may be used to provide a driver with back-up collision warning, blind spot detection, lane-departure warnings, as well as driver-alertness monitoring, assisted parking, traffic sign recognition, and the like.

While the above systems do provide the driver with warnings of potential dangers, these systems fail to provide any information about a projected path of the projected danger. For example, while a blind spot detection system is able to monitor if a vehicle or other object is located in a blind spot of a vehicle, the blind spot detection system does not provide any information as to whether the vehicle and or object detected is moving towards or away from the vehicle. Similarly, while back-up warning systems may alert a driver to potential objects located behind the vehicle while the vehicle is in reverse, these systems also fail to provide any information as to whether the object is moving towards or away from the vehicle.

Therefore, it would be desirable to provide a vehicle warning system and method that overcome the above problems.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

A system for warning of potential hazards when a vehicle is turning has a sensor coupled to the vehicle and configured to capture data of objects located around the vehicle. A control unit is coupled to the sensor for processing the data captured by the sensor to generate graphical representations of objects captured by the sensor, graphical representations of projected paths of moving objects captured by the sensor; and a graphical representation of a projected turning path of the vehicle.

A system for warning of potential hazards when a vehicle is turning has image sensors coupled to the vehicle and configured to capture pedestrians located around the vehicle. Monitoring sensors are coupled to the vehicle to measure the speed and turning angle of the vehicle. A control unit is coupled to the image sensors and monitoring sensors for processing data from the image sensors and monitoring sensors and to generate graphical representations of pedestrians captured by the image sensors, graphical representations of virtual crosswalks associated with pedestrians moving near the vehicle; and graphical representations indicating a projected turning path of the vehicle. A display is used to show the graphical representations of pedestrians captured by the sensor, graphical representations of the virtual crosswalks associated with pedestrians moving near the vehicle; and graphical representations indicating the projected turning path of the vehicle.

A system for warning of potential hazards when a vehicle is turning has image sensors coupled to the vehicle and configured to capture pedestrians located around the vehicle. Monitoring sensors are coupled to the vehicle to measure a speed and a turning angle of the vehicle. A control unit is coupled to the image sensors and monitoring sensors for processing data from the image sensors and monitoring sensors, wherein the control unit generates graphical representations of pedestrians captured by the sensor, graphical representations of virtual crosswalks associated with pedestrians moving near the vehicle; and graphical representations indicating a projected turning path of the vehicle when the monitoring sensors indicates that the vehicle is turning, wherein the graphical representation indicating the projected turning path of the vehicle is divided into a plurality of sections, each section having an indicator, wherein each indicator illustrates a probability of impact with the moving pedestrian. A Heads-Up Display HUD system is coupled to the control unit to show the graphical representations of pedestrians captured by the sensor, graphical representations of virtual crosswalks associated with pedestrians moving near the vehicle; and graphical representations indicating the projected turning path of the vehicle.

BRIEF DESCRIPTION OF DRAWINGS

Embodiments of the disclosure will become more fully understood from the detailed description and the accompanying drawings, wherein.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
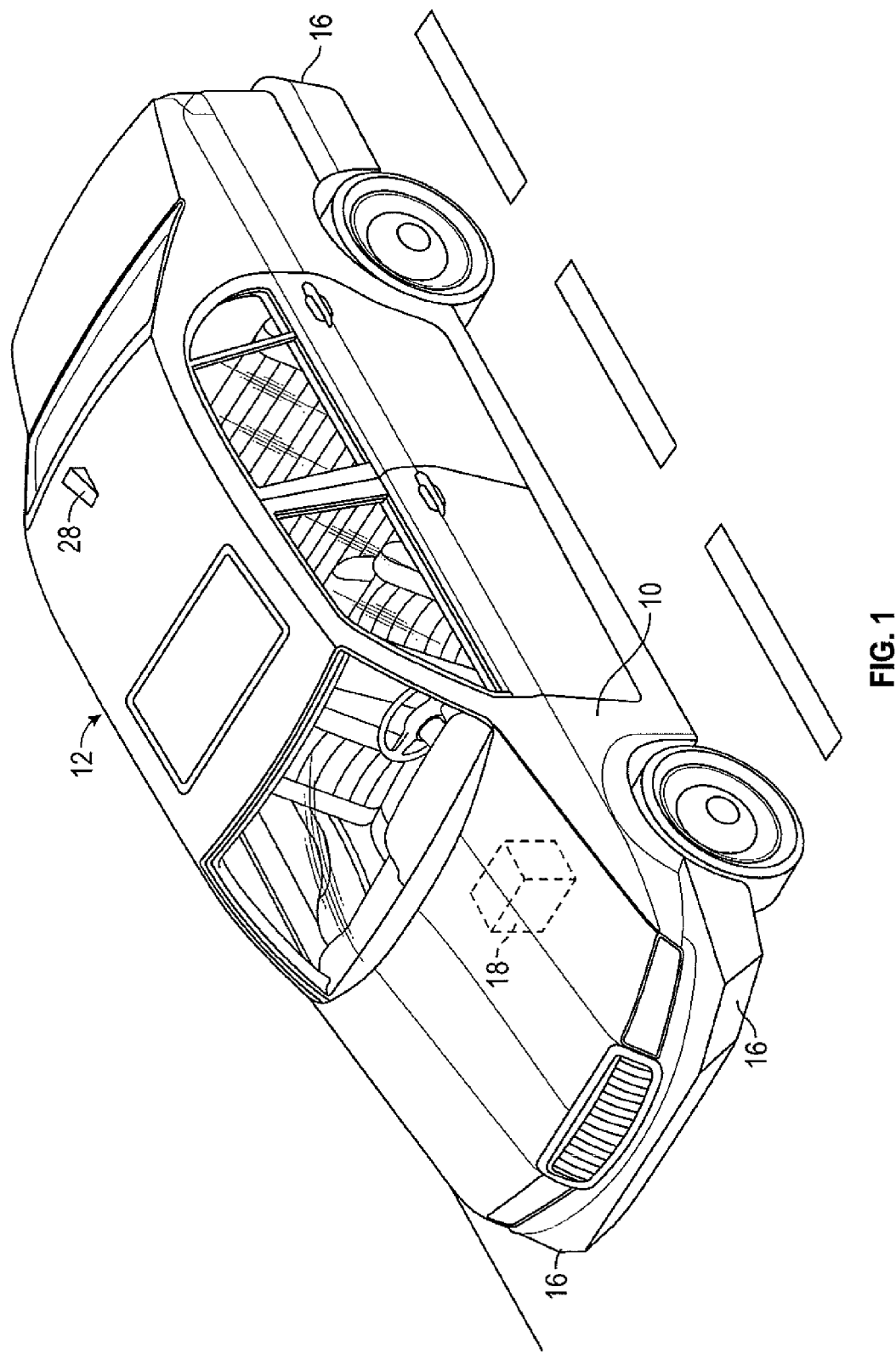
FIG. 1 is an elevated perspective view of a vehicle implementing an exemplary warning system that may be used to enhance a driver's awareness of surrounding pedestrians and objects when the vehicle is turning in accordance with one aspect of the present application.

Referring to FIG. 1, an exemplary vehicle 10 is shown. The vehicle 10 may be equipped with a warning system 12 that may be used to enhance a driver's awareness of surrounding pedestrians and objects when the vehicle 10 is turning. The warning system 12 may be configured to project an actual location and dynamics of pedestrians or other moving objects. The warning system 12 may also show a projected path of the vehicle 10 calculated based on a current speed and steering angle of the vehicle 10.

Figure 2:
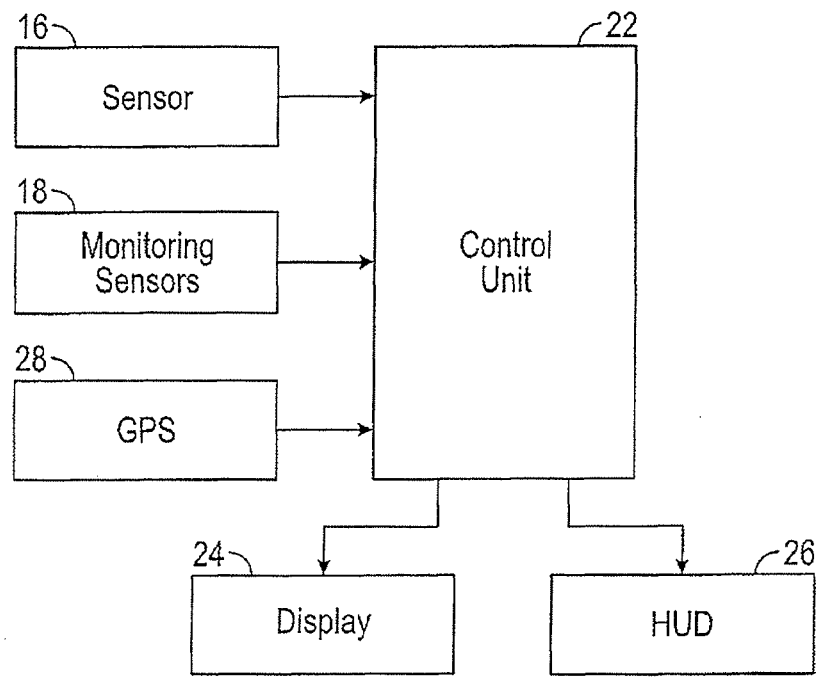
FIG. 2 is a simplified functional block diagram of the exemplary warning system depicted in FIG. 1 in accordance with one aspect of the present application.

Referring now to FIGS. 1 and 2, the warning system 12 may have a plurality of sensors 16. The sensors 16 may be positioned around a perimeter of the vehicle 10. In the embodiment shown in FIG. 1, the sensors 16 may be configured to be mounted within the body of the vehicle 10. However, this is only shown as an example and should not be seen in a limiting manner. The sensors 16 may be used to capture data of objects located around the vehicle 10. The sensors 16 may be cameras, image sensing devices, radar or the like. The above mentioned types of sensors 16 are given as an example and should not be seen in a limiting manner. Alternatively, the sensors 16 may be located on the street the vehicle 10 is traveling. The sensors 16 may be configures to capture data of objects located around the vehicle 10 and transmit the captured data to the vehicle 10.

The warning system 12 may further have one or more monitoring sensors 18. The monitoring sensor 18 may be coupled to one or more operating systems 20 of the vehicle 10. The monitoring sensor 18 may be used to detect operating conditions of the vehicle 10. For example, the monitoring sensor 18 may be used to monitor a speed of the vehicle 10, whether the vehicle 10 is making a turn, or the like. In accordance with one embodiment, the warning system 12 may be configured to not process and display the location and dynamics of pedestrians detected unless the monitoring sensors 18 detects that the vehicle 10 is making a turn. A threshold value may be established so that common road vibrations and slight movement of the a steering mechanism of the vehicle 10 may not accidently trigger the warning system 10 to project the location and dynamics of the pedestrians detected. In one embodiment, the warning system 10 may be used when the user enables their left hand signal.

In accordance with another embodiment, a Global Positioning Satellite (GPS) unit 28 located in the vehicle 10 may be used to determine if the vehicle 10 is moving and or turning. Since the GPS unit 28 may be able to provide speed and direction of travel data on the vehicle 10, the GPS unit 28 may be used to determine if the vehicle 10 is moving and or turning. The warning system 12 may be configured to not process and display the location and dynamics of pedestrians detected unless the GPS unit 28 detects that the vehicle 10 is making a turn and or moving.

The sensors 16 and the monitoring sensors 18 may be coupled to a control unit 22. The control unit 22 may take and process the data captured by the sensors 16. The control unit 22 may process the data in order to detect and identify the different objects detected by the sensors 16. The control unit 22 may identify the position of the different objects as well as the whether the object is moving. If moving, the control unit 22 may be used to calculate the speed and direction of the moving object. The control unit 22 may then take the process data and generate graphical representations of the objects captured by the sensors 16 and provide graphical representations of the projected paths of the moving objects.

The control unit 22 may also process data generated by the monitoring sensors 18 of the vehicle 10. The control unit 22 may receive data from the monitoring sensors 18 in order to determine if the vehicle 10 is making a turn and the speed the vehicle 10 may be traveling. If the control unit 22 determines that the vehicle 10 is turning, the control unit 22 may generate a graphical representation indicating the projected turning path of the vehicle 10.

The warning system 12 is a dynamic system. Thus, the control unit 22 may continuously update graphical representations of the objects captured by the sensors 16 as the vehicle 10 is turning. Thus, graphical representations of projected paths of the objects detected that are moving may be continuously updated. Graphical representations indicating the projected turning path of the vehicle 10 may also be continuously updated as the vehicle 10 progresses into the turn.

The control unit 22 may be coupled to a display 24. The display 24 may be used to show the graphical representations generated by the control unit 22 of the objects captured by the sensors 16, projected paths of the moving objects, as well as the graphical representation indicating the projected turning path of the vehicle 10. Alternatively, the control unit 22 may be coupled to a Heads Up Display (HUD) system 26. The HUD system 26 may be used to display the graphical representations generated by the control unit 22 of the objects captured by the sensors 16, projected paths of the moving objects, as well as the graphical representation indicating the projected turning path of the vehicle 10.

The warning system 12 may be configured so that the display 24 and or HUD system 26 displays the general area viewable in front of the driver when the driver is seated in the vehicle 10 (hereinafter Field of View (FOV) of the driver). However, for objects detected by the sensors 16 but not in the FOV of the driver or towards a far edge of the FOV, for example a pedestrian located behind the vehicle 10, symbols and or warning text and a string indicating a general position of the detected object may be generated and shown on the display 24 and or HUD system 26.

As stated above, a Global Positioning Satellite (GPS) unit 28 may be coupled to the control unit 22. The GPS unit 28 may be used to provide geographical information to the control unit 22. Based on the location indicated by the GPS unit 28, the GPS unit 28 may load and transfer location data about the indicated location. For example, the GPS unit 28 may load and transfer satellite imagery of the current location. This imaging may be sent to the control unit 22 which may generate a graphical representation of the satellite images to be shown on the display 24 and or HUD system 26. Further, as disclosed above, the GPS unit 28 may be used to determine if the vehicle 10 is turning and or moving by monitoring the speed and direction of the vehicle 10.

Figure 3:
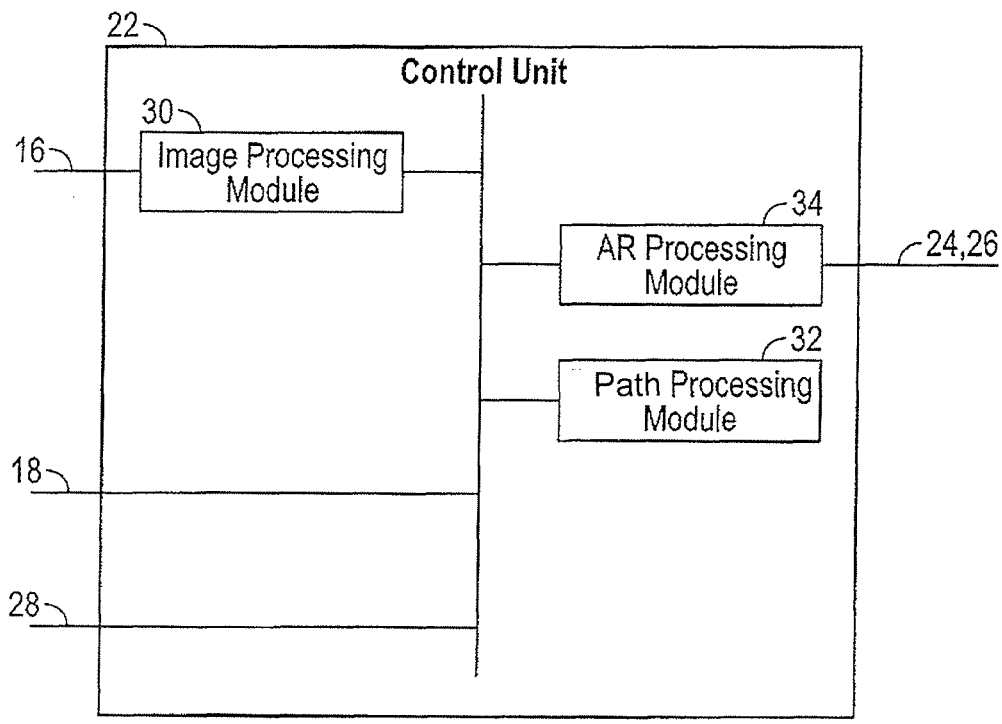
FIG. 3 is a simplified functional block diagram of a control unit shown in FIG. 2 in accordance with one aspect of the present application.
Figure 4:
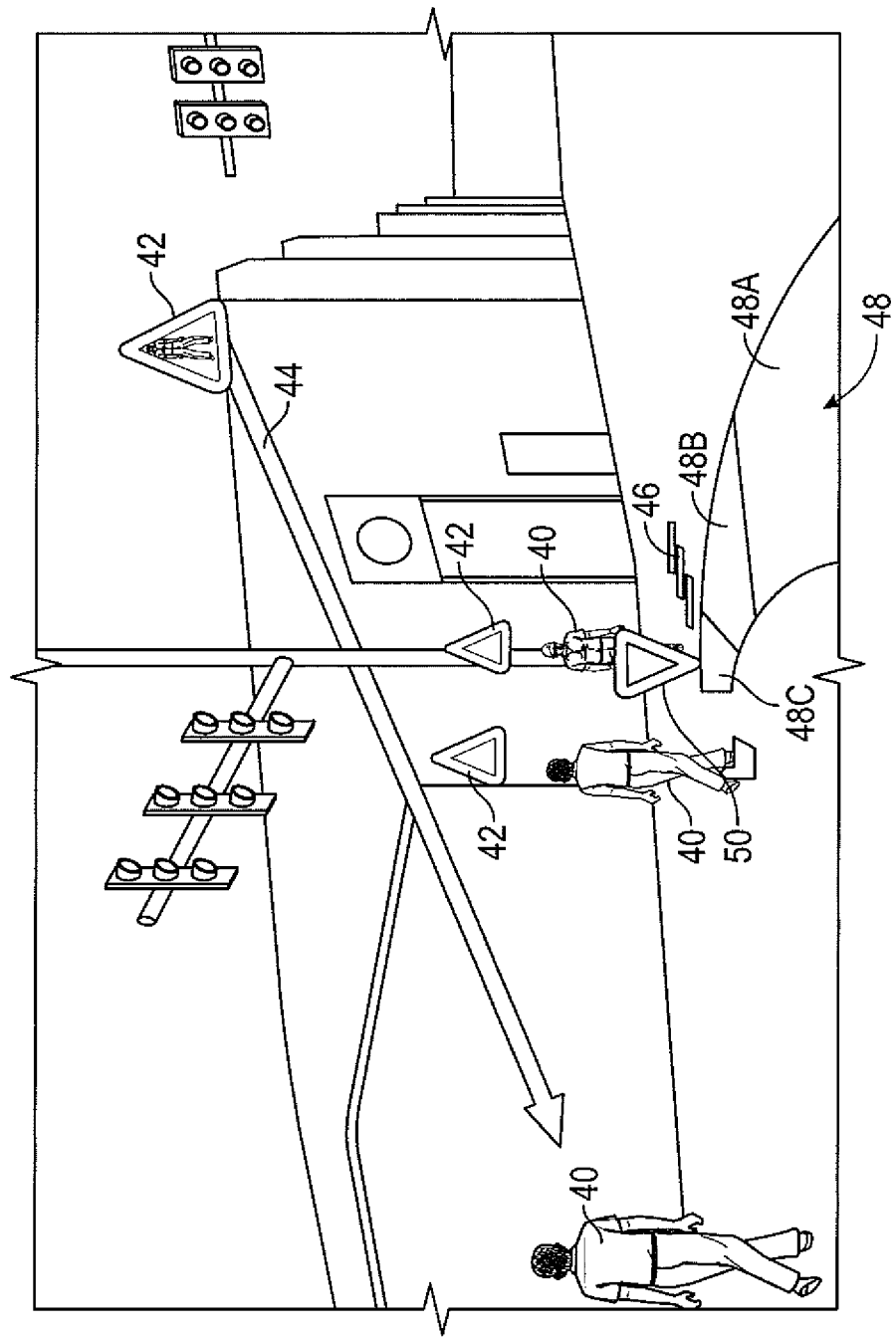
FIG. 4 shows one embodiment of an exemplary Augmented Reality (AR) visual generated by the warning system of FIG. 1 in accordance with one aspect of the present application.
Figure 5:
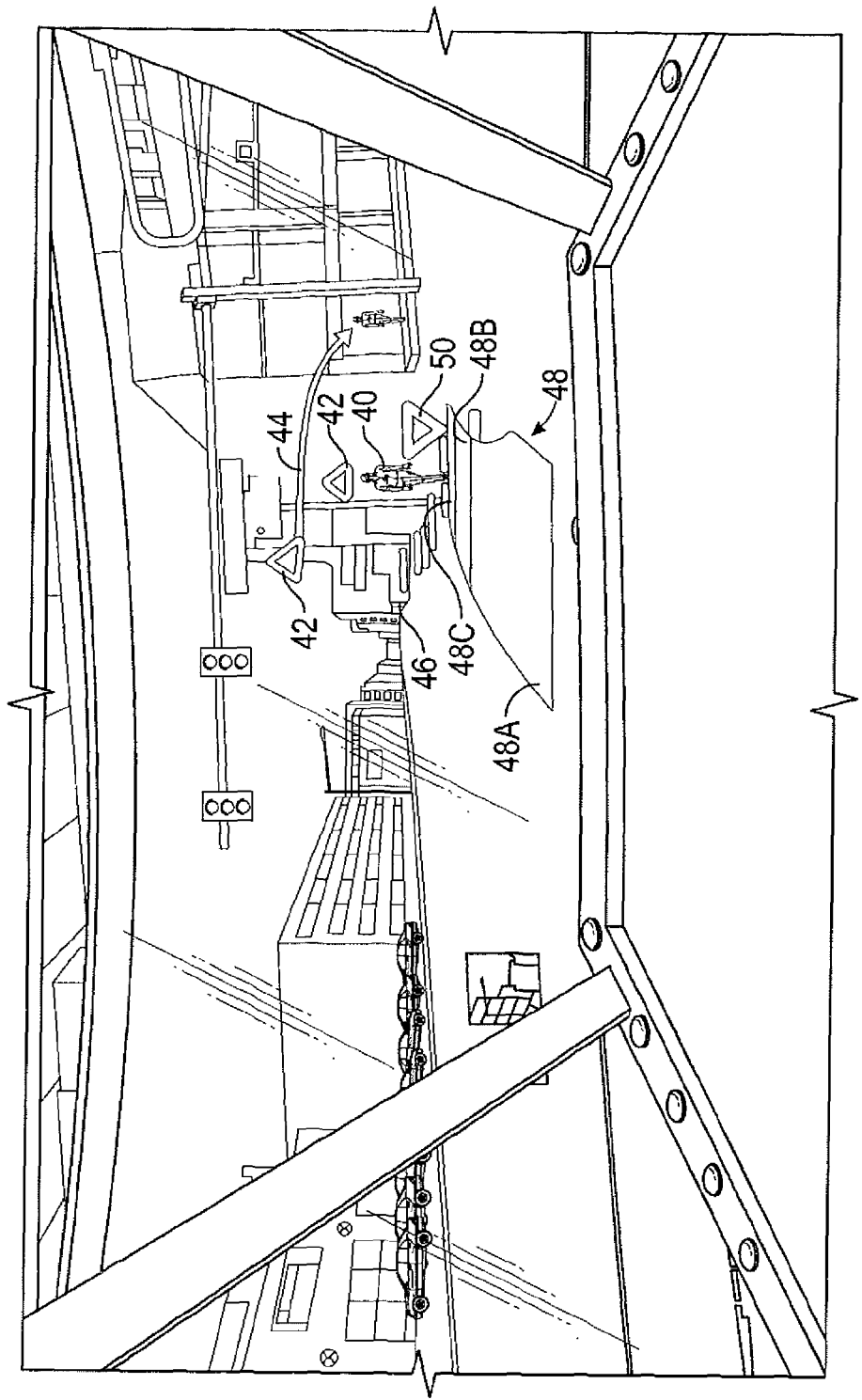
FIG. 5 is another embodiment showing an exemplary Augmented Reality (AR) visual generated by the warning system of FIG. 1 in accordance with one aspect of the present application.

Referring now to FIG. 3, a functional block diagram of the control unit 22 may be seen. The control unit 22 may have an image processing module 30. The image processing module 30 may be coupled to the sensors 16. The image processing module 30 may process the data from the sensors 16 in order to detect and identify the different objects detected by the sensors 16. The image processing module 30 may identify the different objects detected as well as determine whether the object is moving. In accordance with one embodiment, the image processing module 30 may be configured to identify and distinguish pedestrians from other objects detected around the vehicle 10. Thus, the image processing module 30 may be used to identify potential hazardous situations to the driver, such as pedestrians or bicyclist, as opposed to non-hazardous objects such as a fire hydrant or the like. The control unit 22 may be configured so that potential hazardous objects like pedestrians are shown, while non-hazardous objects may not be processed and or displayed.

If an object is detected as moving, the image processing module 30 may be used to calculate the speed and direction of the moving object. Based on the calculated speed and direction of the moving object, a path processing module 32 of the control unit 22 may be used to calculate a projected path of the moving object. The path processing module 32 may further be used to calculate a projected turning path of the vehicle 10. The path processing module 32 may receive data from the monitoring sensor 18 and or GPS unit 28 indicating speed and directional information of the vehicle 10. Based on this information, the path processing module 32 may calculate the projected turning path of the vehicle 10.

An augmented reality processing module 34 of the control unit 22 may be used to generate graphical representations of the different objects detected by the sensors 16, graphical representations of the projected paths of the moving objects and graphical representations indicating the projected turning path of the vehicle 10. The augmented reality processing module 34 may further generate graphical representations of location data provided by the GPS unit 28. The graphical representations generated by the augmented reality processing module 34 may be two dimensional representations or three dimensional representations.

The graphical representations generated by the augmented reality processing module 34 may be shown on a display 24 located within the vehicle 10. Alternatively, the HUD system 26 may be used to display the graphical representations generated by the augmented reality processing module 34.

Referring now to FIGS. 1-4, an exemplary embodiment of an augmented reality generated and displayed by the warning system 10 may be seen. The augmented reality shown may be the FOV in front of the driver when the driver is seated in the vehicle 12. The exemplary embodiment shown in FIG. 4 may illustrate the vehicle 10 making a left turn.

The control unit 22 may generate one or more graphical representations of pedestrians 40 detected by the sensors 16. In the present embodiment, two pedestrians 40 may be seen as being in the FOV of the driver. To highlight the position of the pedestrians 40, a sign 42 or other symbol may be placed adjacent to each pedestrian 40. In the embodiment shown, the signs 42 may be positioned above each respective pedestrian 40 in the FOV of the driver. The signs 42 may flash and or blink to further draw the driver's attention to the pedestrians 40 in the FOV of the driver.

If a pedestrian 40 is out of the FOV or towards the outer edge of the FOV of the driver, a sign 42 with a pointer 44 may be used to indicate a general position of the pedestrian 40 who is out of or towards the outer edge of the FOV of the driver. The sign 42 and pointer 44 may flash and or blink to further draw the driver's attention to the pedestrians 40 who may be out of or towards the outer edge of the FOV of the driver.

The augmented reality shown may further include a virtual crosswalk 46 for pedestrians 40 who may be seen as being in the FOV of the driver. The virtual crosswalk 46 may be used to identify a projected path of the pedestrians 40 who may be seen as being in the FOV of the driver. The virtual crosswalk 46 may be dynamic and change position based on the movement of the pedestrians 40 who may be seen as being in the FOV of the driver. The virtual crosswalk 46 may be calculated based on the position, speed and direction of the pedestrians 40.

The augmented reality shown may further include a graphical representation of a projected turning path 48 (hereinafter turning path 48) of the vehicle 10. The turning path 48 may be dynamic and adjust in length/size as the vehicle 10 moves during the turn. The turning path 48 may be calculated based on the speed and turning angle of the vehicle 10.

The turning path 48 may be color coded based on the distance between the vehicle 10 intersecting with a particular pedestrian 40. In accordance with one embodiment, the turning path 48 may be color coded to provide a visual indication/warning to the driver. For example, in the turning path 48 shown in FIG. 4, a first section 48A of the turning path 48 may be shown in a first color (for example green) to indicate that in the first section 48A, based on present speed and direction of the vehicle 10, the driver generally will not intersect with the particular pedestrian 40. The turning path 48 may further have a second section 48B which may be shown in a second color (for example yellow) to indicate that in the second section 48B, based on present speed and direction of the vehicle 10, the driver should slow down and or yield so as not to intersect with the particular pedestrian 40. The turning path 48 may further have a third section 48C which may be shown in a third color (for example red) to indicate that in the third section 48B, based on present speed and direction of the vehicle 10, the driver should stop so as not to intersect with the particular pedestrian 40.

The augmented reality shown may further include a warning sign 50. The warning sign 50 may be positioned along the turning path 48. The warning sign 50 may be used to further provide a visual warning to the driver. For example, based on the current speed and turning angle of the vehicle 10, the warning sign 50 may indicate to the driver to go, yield, stop or the like.

Referring now to FIGS. 1-3 and 5, another exemplary embodiment of an augmented reality generated and displayed by the warning system 10 may be seen. The augmented reality shown may be the FOV in front of the driver when the driver is seated in the vehicle 12. The exemplary embodiment shown in FIG. 5 may illustrate the vehicle 10 making a right turn.

The control unit 22 may generate one or more graphical representations of a pedestrian 40 detected by the sensors 16. In the present embodiment, one pedestrian 40 may be seen as being in the FOV of the driver. To highlight the position of the pedestrian 40, a sign 42 or other symbol may be placed adjacent to each pedestrian 40. In the embodiment shown, the sign 42 may be positioned above the pedestrian 40 in the FOV of the driver. The sign 42 may flash and or blink to further draw the driver's attention to the pedestrian 40 in the FOV of the driver.

If a pedestrian 40 is out of the FOV or towards the outer edge of the FOV of the driver, a sign 42 with a pointer 44 may be used to indicate a general position of the pedestrian 40 who is out of or towards the outer edge of the FOV of the driver. The sign 42 and pointer 44 may flash and or blink to further draw the driver's attention to the pedestrians 40 who may be out of or towards the outer edge of the FOV of the driver.

The augmented reality shown may further include a virtual crosswalk 46 for the pedestrian 40 who may be seen as being in the FOV of the driver. The virtual crosswalk 46 may be used to identify a projected path of the pedestrian 40 who may be seen as being in the FOV of the driver. The virtual crosswalk 46 may be dynamic and change position based on the movement of the pedestrian 40 who may be seen as being in the FOV of the driver. The virtual crosswalk 46 may be calculated based on the position, speed and direction of the pedestrian 40.

The augmented reality shown may further include a graphical representation of a projected turning path 48 (hereinafter turning path 48) of the vehicle 10. The turning path 48 may be dynamic and adjust in length/size as the vehicle 10 moves during the turn. The turning path 48 may be calculated based on the speed and turning angle of the vehicle 10.

The turning path 48 may be color coded based on the distance between the vehicle 10 intersecting with a particular pedestrian 40. In accordance with one embodiment, the turning path 48 may be color coded to provide a visual indication/warning to the driver. For example, in the turning path 48 shown in FIG. 5, a first section 48A of the turning path 48 may be shown in a first color (for example green) to indicate that in the first section 48A, based on present speed and direction of the vehicle 10, the driver generally will not intersect with the particular pedestrian 40. The turning path 48 may further have a second section 48B which may be shown in a second color (for example yellow) to indicate that in the second section 48B, based on present speed and direction of the vehicle 10, the driver should slow down and or yield so as not to intersect with the particular pedestrian 40. The turning path 48 may further have a third section 48C which may be shown in a third color (for example red) to indicate that in the third section 48B, based on present speed and direction of the vehicle 10, the driver should stop so as not to intersect with the particular pedestrian 40.

The augmented reality shown may further include a warning sign 50. The warning sign 50 may be positioned along the turning path 48. The warning sign 50 may be used to further provide a visual warning to the driver. For example, based on the current speed and turning angle of the vehicle 10, the warning sign 50 may indicate to the driver to go, yield, stop or the like.

While embodiments of the disclosure have been described in terms of various specific embodiments, those skilled in the art will recognize that the embodiments of the disclosure may be practiced with modifications within the spirit and scope of the claims.

What is claimed is:

1. A system for warning of potential hazards when a vehicle is turning comprising:
   a sensor coupled to the vehicle and configured to capture data of objects located around the vehicle;
   monitoring sensors coupled to the vehicle to measure a speed and a turning angle of the vehicle; and
   a control unit coupled to the sensor for processing the data captured by the sensor to:
   generate graphical representations of objects captured by the sensor;
   generate graphical representations of projected paths of moving objects captured by the sensors based on speeds and travel directions of the moving objects;
   calculate a projected turning path of the vehicle based on the speed and the turning angle of the vehicle; and
   generate a graphical representation of the projected turning path, wherein the graphical representation indicating the projected turning path of the vehicle is divided into a plurality of sections, each section having a respective indicator, wherein each indicator illustrates a probability of impact with the moving object in the respective section of the projected turning path.

2. The system of claim 1, wherein each section is color coded to illustrate the probability of impact with the moving object in the respective section of the projected turning path.

3. The system of claim 1, further comprising monitoring sensors coupled to the vehicle and the control unit for monitoring at least one of the turning angle or the speed of the vehicle.

4. The system of claim 1, wherein the control unit generates the graphical representations of objects captured by the sensor, the graphical representations of projected paths of moving objects captured by the sensor, and the graphical representation of a projected turning path of the vehicle when the sensor indicates that the vehicle is turning.

5. The system of claim 1, further comprising a Global Positioning Satellite (GPS) system coupled to the vehicle and the control unit.

6. The system of claim 5, wherein the GPS system transfers imagery of a current location of the vehicle to the control unit, the control unit generating graphical representations of imagery transferred from the GPS of the current location.

7. The system of claim 1, further comprising a display coupled to the control unit to show the graphical representations of objects captured by the sensor, the graphical representations of projected paths of moving objects captured by the sensor, and the graphical representation indicating the projected turning path of the vehicle.

8. The system of claim 1, wherein the control unit comprises:
   an image processing module coupled to the sensor to identify the objects detected by the sensors;
   a path processing module to calculate the projected paths of moving objects detected by the sensor and the projected turning path of the vehicle; and
   an Augmented Reality (AR) processing module to generate the graphical representations of the objects detected by the sensor, the graphical representations of the projected paths of the moving objects and the graphical representations indicating the projected turning path of the vehicle, wherein the projected turning path of the vehicle is dynamic and adjusts in size as the vehicle moves during the turn.

9. The system of claim 1, wherein the graphical representations of the objects detected by the sensor are two dimensional.

10. The system of claim 1, wherein the graphical representations of the objects detected by the sensor are three dimensional.

11. The system of claim 1, wherein the graphical representations of the objects include a first sign associated with at least one of the objects detected by the sensor which is in a Field of View (FOV) of a driver of the vehicle.

12. The system of claim 11, wherein the graphical representations of the objects include:
a second sign associated with at least one of the objects detected by the sensor which is outside of the FOV of the driver of the vehicle; and
a pointer sign associated with the second sign and positioned to indicate a location of the at least one of the objects detected by the sensor which is outside the FOV of the driver.

13. A system for warning of potential hazards when a vehicle is turning comprising:
image sensors coupled to the vehicle and configured to capture pedestrians located around the vehicle;
monitoring sensors coupled to the vehicle to measure speed and turning angle of the vehicle;
a control unit coupled to the image sensors and monitoring sensors for processing data from the image sensors and monitoring sensors and to:
generate graphical representations of pedestrians captured by the image sensors;
generate graphical representations of virtual crosswalks associated with pedestrians moving near the vehicle showing projected pathways of the pedestrians based on a speed and a travel direction of each of the pedestrians;
calculate a projected turning path of the vehicle based on a speed and turning angle of the vehicle; and
generate a graphical representation indicating the projected turning path of the vehicle, wherein the graphical representation indicating the projected turning path of the vehicle is divided into a plurality of sections, each section having a respective indicator, wherein each indicator illustrates a probability of impact with the moving object in the respective section of the projected turning path; and
a display to show the graphical representations of pedestrians captured by the sensor, the graphical representations of the virtual crosswalks associated with pedestrians moving near the vehicle; and the graphical representation indicating the projected turning path of the vehicle.

14. The system of claim 13, further comprising a Global Positioning Satellite (GPS) system coupled to the vehicle and the control unit to transfer imagery of a current location of the vehicle to the control unit.

15. The system of claim 13, wherein the control unit comprises:
an image processing module coupled to the image sensors;
a path processing module to calculate the virtual crosswalks and the projected turning path of the vehicle; and
an Augmented Reality (AR) processing module to generate the graphical representations of the pedestrians detected by the sensor, the graphical representations of the virtual crosswalks and the graphical representations indicating the projected turning path of the vehicle, wherein the projected turning path of the vehicle is dynamic and adjusts in size as the vehicle moves during the turn.

16. The system of claim 13, wherein the control unit generates the graphical representations of pedestrians captured by the image sensors, the graphical representations of virtual crosswalks associated with pedestrians moving near the vehicle; and the graphical representations indicating the projected turning path of the vehicle when the monitoring sensors indicate that the vehicle is turning.

17. A system for warning of potential hazards when a vehicle is turning comprising:
image sensors coupled to the vehicle and configured to capture pedestrians located around the vehicle;
monitoring sensors coupled to the vehicle to measure a speed and a turning angle of the vehicle;
a control unit coupled to the image sensors and monitoring sensors for processing data from the image sensors and monitoring sensors, wherein the control unit is configured to:
generate graphical representations of pedestrians captured by the sensor;
generate graphical representations of virtual crosswalks associated with pedestrians moving near the vehicle showing projected pathways of the pedestrians based on a speed and a travel direction of each of the pedestrians;
calculate a projected turning path of the vehicle based on a speed and turning angle of the vehicle; and
generate a graphical representation indicating the projected turning path of the vehicle when the monitoring sensors indicate that the vehicle is turning, wherein the graphical representation indicating the projected turning path of the vehicle is divided into a plurality of sections, each section having a respective indicator, wherein each indicator illustrates a probability of impact with the moving pedestrian in the respective section of the projected turning path; and
a Heads-Up Display HUD system coupled to the control unit to show the graphical representations of pedestrians captured by the sensor, the graphical representations of virtual crosswalks associated with pedestrians moving near the vehicle, and the graphical representations indicating the projected turning path of the vehicle.

18. The system of claim 17, wherein the control unit comprises:
an image processing module coupled to the image sensors;
a path processing module to calculate the virtual crosswalks and the projected turning path of the vehicle; and
an Augmented Reality (AR) processing module to generate the graphical representations of the pedestrians detected by the sensor, the graphical representations of the virtual crosswalks and the graphical representation indicating the projected turning path of the vehicle.

* * * * *